United States Patent Office 2,730,546
Patented Jan. 10, 1956

2,730,546

PROCESS FOR THE PRODUCTION OF ALIPHATIC ACID ANHYDRIDES BY CARBONYLATION OF ESTERS

Walter Reppe, Ludwigshafen (Rhine), and Herbert Friederich, Worms, Germany, assignors to Badische Anilin- & Soda-Fabrik Aktiengesellschaft, Ludwigshafen (Rhine), Rheinland-Pfalz, Germany No Drawing. Application May 1, 1953, Serial No. 352,594

Claims priority, application Germany May 7, 1952

19 Claims. (Cl. 260—549)

This invention relates to the production of aliphatic oxygen compounds, in particular carboxylic acid, their esters and anhydrides, by the interaction of aliphatic carboxylic acid esters with carbon monoxide in the presence of novel carbonylation catalysts. More particularly, our invention relates to heating an ester of a carboxylic acid with an aliphatic saturated alcohol with carbon monoxide or a mixture thereof with hydrogen under superatmospheric pressure in the liquid phase in the presence of novel carbonylation catalysts. In still more specific terms our invention is directed to the synthesis of low molecular saturated aliphatic carboxylic acids, their esters and anhydrides by treating lower fatty acid esters of lower aliphatic saturated alcohols with carbon monoxide-containing gases under superatmospheric pressure at elevated temperatures in the presence of complex cobalt halides.

It has been known that alcohols, in particular methanol, or their ethers may be carbonylated to form aliphatic oxygen compounds containing more carbon atoms than the starting material. In these carbonylations either carbon monoxide or mixtures thereof with hydrogen have been used, the reaction conditions as to temperatures and pressures have been varied to a large extent and a number of catalysts have been proposed.

It is generally accepted today that carbonyl-forming metals or their compounds are the most active catalysts for such carbonylations. They are far superior to other catalysts both in rate of conversion and yields of the desired materials. Nevertheless, the known carbonylation catalysts of this type have some drawbacks. They are converted into metal carbonyls in the course of the reaction and dissolved as such in the reaction product. This makes it necessary to regenerate the carbonyl forming metal as a matter of purification and economy.

It is an object of our invention to provide for the carbonylation of esters with carbon monoxide catalysts which give satisfactory rates of conversion and yields and are free from the drawback mentioned above.

According to our invention the reaction of methyl acetate and other carboxylic acid esters of saturated lower aliphatic alcohols is carried out in the presence of complex cobalt halides which contain in the molecule in addition to the cobalt halide also an organic onium halide, e. g. an ammonium or phosphonium halide.

Suitable catalysts of this type are in particular tertiary and quaternary ammonium cobalt bromides, corresponding bromides-iodides or the iodides. These compounds correspond to the general formula:

$$[A_4N]_2 \cdot Co \cdot X_4$$

wherein A stands for a lower molecular alkyl radicle, in particular a hydrocarbon radicle containing between 1 and 4 carbon atoms, or two of the A form an alkylene radicle as in a pyrrolidine ring, and X stands for a halide ion, in particular bromide or iodide ion. It is self understood that in the tetraalkyl ammonium radicle as defined above several of the alkyl groups may be replaced by aralkyl, e. g. benzyl or cyclo alkyl, e. g. cyclohexyl radicles, or that another quaternary ammonium compound may be used, such as benzyl or alkyl pyridinium radicles. To cite a few examples of such compounds we name e. g.:

Triethyl butyl ammonium cobalt bromide $$[(C_2H_5)_3(C_4H_9)N]_2 \cdot CoBr_4$$

Diethyl dibutyl ammonium cobalt iodide $$[(C_2H_5)_2(C_4H_9)_2N]_2 \cdot CoI_4$$

Tetra propyl ammonium cobalt bromide iodide $$[C_3H_7)_4N]_2 \cdot CoBr_2I_2$$

Trimethyl cyclohexyl ammonium cobalt bromide $$[(CH_3)_3(C_6H_{11})N]_2 \cdot CoBr_4$$

Dimethyl pyrrolidinium cobalt iodide $$[(CH_3)_2(C_4H_8N)]_2 \cdot CoI_4$$

Butyl pyridinium cobalt bromide $$[(C_5H_5N)(C_4H_9)]_2 \cdot CoBr_4$$

Benzyl pyridinium cobalt iodide $$[(C_5H_5N)(C_6H_5CH_2)]_2 \cdot CoI_4$$

and analogous compounds.

Instead of the ammonium compounds, we may as well use the corresponding phosphonium compounds, in particular the triaryl alkyl phosphonium cobalt bromides, wherein the alkyl contains between 1 and 4 carbon atoms and the aryl is a mononuclear hydrocarbon radicle of the benzene series, e. g. phenyl or a homologue thereof, such as tolyl or xylyl. In all these cases, the catalysts may also be formed in situ, e. g. by adding to the starting material a cobalt halide and a tertiary or quaternary ammonium or phosphonium halide.

These catalysts have various advantages over those conventionally used in such carbonylations. Generally speaking, it is possible to obtain the same yields and conversions at relatively low temperatures as compared with the known catalysts. Due to the specific constitution of the novel catalysts very little cobalt carbonyl is formed so that the catalysts can be used repeatedly for a long time while at the same time the reaction products can be isolated free from soluble cobalt compounds in a very simple manner.

We prefer to carry out the reaction at temperatures between 70° and 250° C. Higher temperatures, e. g. up to 300° C., may also be used but by-product formation is more pronounced under these conditions. We use superatmospheric pressure, preferably pressures above 50 atmospheres and most preferably in the range between 200 and 300 atmospheres. There is no principal obstacle against using higher pressures, such as 700 or 800 atmospheres.

The carbon monoxide used may be pure; it may also contain other gases, such as nitrogen, methane, carbon dioxide and/or hydrogen. When working with a mixture of carbon monoxide with other gases, it is recommended to keep the minimum concentration of carbon monoxide at 10 per cent. The ratio between carbon monoxide and hydrogen, if this is present, has some influence on the nature of the reaction product. When working with an excess of carbon monoxide over hydrogen, e. g. up to a 40 per cent concentration of the latter the main products are carboxylic acids, their esters or, in the absence of water, anhydrides. The carbon monoxide or the carbon monoxide-hydrogen mixture respectively should be substantially free from hydrogen sulfide.

The reaction may be carried out discontinuously, e. g. in pressure-tight vessels made from steel. We may also work continuously. In all cases there is no necessity to carry on the action of carbon monoxide on the starting material until all of the latter has been converted. We sometimes prefer to carry on the reaction until only part of the starting material has been converted, separate the unchanged material from the reaction product and lead it back to the reaction. The preferred method of working up the reaction mixture is distillation, eventually under superatmospheric pressure or under reduced pressure. The conventional distillation techniques may be used, such as using azeotropic distillation or distilling in the presence of steam. The catalyst used will be found in most cases substantially unchanged in the distillation residue. As a rule it may be used again without further purification.

While the amount of catalyst used is not an essential feature of our process, we prefer to use a concentration of between 0.01 to 3 per cent of cobalt in the complex form calculated on the starting material. The activity of the catalysts may sometimes be increased by the addition of organic nitrogen bases, such as pyridine and its homologues. Since the starting material is usually used in excess, the use of an additional solvent may be avoided. In principle such solvents, e. g. hydrocarbons, esters, ethers, N-alkyl lactams, carboxylic acids or the reactions products, may be employed.

The reaction runs most smoothly when starting with the esters from lower fatty acids, such as acetic and propionic acid, and lower alcohols, e. g. methanol, ethanol, propanol, and butanol. However, it may be also applied with satisfactory results to higher esters, such as butyl butyrate. We may also use mixtures of esters.

The main reaction product, when avoiding the presence of water, is an anhydride of a carboxylic acid. This reaction proceeds corresponding to the following equation, based on the carbonylation of methyl acetate:

1. 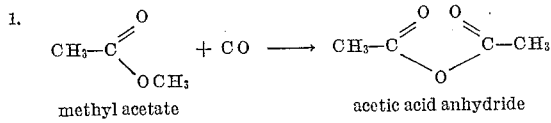

methyl acetate        acetic acid anhydride

Mixed anhydrides are obtained when in the starting ester the radicle attached to the carboxylic acid group is different from the radicle of the alcohol. Thus, ethyl acetate gives, in the absence of water, acetic propionic acid anhydride 2. 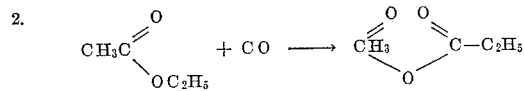

When working in the presence of water, the anhydrides are not formed but the corresponding free acids and, as by-products, esters formed by mutual reesterification with the starting material. We prefer to work in the absence of water because under these conditions there is little danger of corrosion. The reaction equipment, therefore, can be constructed from ordinary steel.

Our present invention makes it possible to prepare carboxylic acids indirectly by the carbonylation of alcohols having one carbon atom less while avoiding the danger of corrosion. When carbonylating alcohols in the conventional way, e. g. producing acetic acid from methanol according to the following equation:

3.        $CH_3OH + CO \rightarrow CH_3COOH$ there will always be formed the corresponding ester by the interaction of the carboxylic acid with the alcohol. The water formed in this esterification is the cause of the corrosion encountered in such carbonylations.

By treating a carboxylic acid ester, e. g. methyl acetate, with carbon monoxide according to our present invention under anhydrous conditions in an ordinary pressure resistant vessel, a carboxylic acid anhydride, e. g. acetic acid anhydride, is formed according to the Equation 1. This may be caused to react under normal conditions in a simple, enamelled vessel with an alcohol, e. g. methanol, to form a carboxylic acid and its ester, e. g. acetic acid and methyl acetate according to the equation:

$CH_3CO-O-OCCH_3 + CH_3OH \rightarrow$
$CH_3COOH + CH_3COOCH_3$

Separation of these products is very simple, and the ester may be returned into the carbonylation stage according to our invention. The process as a whole thus makes it possible to prepare acetic acid by the carbonylation of methanol without the necessity of working in corrosion-resistant equipment.

The following examples will further illustrate how this invention may be carried out in practice. The invention however, is not restricted to these examples. The parts are by weight.

*Example 1*

A rotating autoclave is charged with a mixture of 50 parts of methyl acetate, 50 parts of N-methyl pyrrolidone and 10 parts of a catalyst consisting of 2 parts of anhydrous cobalt bromide, 3 parts of tetra-ethyl ammonium iodide and 5 parts of tri-phenyl butyl phosphonium bromide [(C₆H₅)₃ (C₄H₉) P] Br. A mixture of 10 parts by volume of carbon monoxide and 1 part by volume of hydrogen is pressed into the autoclave at 180° C. under 200 atmospheres for 15 hours.

The resulting blue-green liquid is fractionated. After unchanged methyl acetate 18 parts of acetic acid anhydride are obtained. The N-methyl pyrrolidone and the catalyst may be used again.

The following table shows the results of various other examples, all starting from 150 parts of methyl acetate and using an equal amount of N-methyl pyrrolidone.

| No. | Catalyst | Gas, CO:H₂ | Temp., °C. | Press., atm. | Time, hrs. | Yield of anhydride, parts |
|---|---|---|---|---|---|---|
| 2 | CoI₂+(CH₃)₄NI | 90:10 | 180 | 200 | 25 | 19 |
| 3 | CoBr₂+(C₂H₅)₃C₄H₉NI+ [(C₆H₅)₃(C₃H₇)P]Br | 90:10 | 180 | 200 | 15 | 38 |
| 4 | CoBr₂+(C₃H₇)₃.C₂H₅NI+ [(C₆H₅)₃(C₂H₅)P]Br | 90:10 | 180 | 200 | 15 | 17 |
| 5 | CoBr₂+(C₂H₅)₄NI+ [(C₆H₅)₃(C₄H₉)P]Br | 95:5 | 180 | 650 | 20 | 153 |
| 6 | CoI₂+(C₂H₅)₃CH₃NBr+ 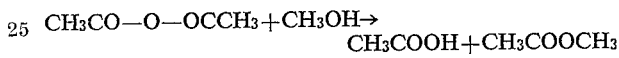 | 95:5 | 180 | 650 | 20 | 123 |
| 7 | [(C₂H₅)₄N]₂.CoBr₂I₂ | 100:0 | 190 | 650 | 6 | 150 |
| 8 | [(C₂H₅)₃(C₄H₉)N]₂.CoBr₂I₂ | 100:0 | 190 | 650 | 8 | 148 |
| 9 | [(C₂H₅)₃(C₄H₉)N]₂.CoBr₄ | 95:5 | 190 | 650 | 10 | 142 |
| 10 | [(C₃H₇)₃(C₄H₉)N]₂.CoBr₄ | 95:5 | 190 | 650 | 10 | 136 |
| 11 | [(C₄H₉)₃(C₂H₅)N]₂.CoBr₄ | 95:5 | 190 | 650 | 10 | 140 |
| 12 | [(C₃H₇)₄N]₂.CoBr₄ | 95:5 | 190 | 650 | 10 | 121 |

Example 13

A mixture of 150 parts of methyl acetate, 150 parts of glacial acetic acid, 10 parts of anhydrous cobalt bromide, 10 parts of tetra ethyl ammonium iodide and 31 parts of tritolyl butyl phosphonium bromide is treated in the manner described in Example 1 at 190° C. with a mixture of 95 per cent CO and 5 per cent $H_2$ under 650 atmospheres for 23 hours. From the reaction mixture there are obtained by distillation unchanged ester, acetic acid and 140 parts of acetic acid anhydride. The catalyst is found unchanged in the distillation residue.

When using a ready made complex salt from cobalt iodide and triethyl butyl ammonium bromide instead of the first two ingredients of the above catalyst, the yield is about 150 parts of the anhydride.

Example 14

In the manner described in Example 1 a mixture of 150 parts of ethyl propionate, 150 parts of propionic acid, 10 parts of anhydrous cobalt bromide, 10 parts of tetra ethyl ammonium iodide and 31 parts of triphenyl butyl phosphonium bromide is treated at 180° C. and under 650 atmospheres with a mixture of 95 per cent CO and 5 per cent $H_2$ for 5 hours. By fractionating the reaction mixture 77 parts of propionic acid anhydride are obtained besides unchanged ethyl propionate and propionic acid.

When starting under otherwise identical conditions with propyl n-butyrate and n-butyric acid 58 parts of n-butyric acid anhydride are obtained.

We claim:

1. In the production of aliphatic oxygen compounds by the action of carbon monoxide on esters of lower saturated fatty acids with saturated lower aliphatic alcohols at superatmospheric temperatures and under superatmospheric pressure in the presence of cobalt compounds, the step which comprises using as the catalyst a complex compound of a cobalt halide wherein the halogen is selected from the group consisting of bromine and iodine with an organic halide selected from the group consisting of quaternary ammonium and phosphonium bromides, iodides and bromide-iodides.

2. In the process as set forth in claim 1 wherein carbon monoxide is used in admixture with hydrgoen.

3. A process for the production of aliphatic oxygen compounds which comprises treating an ester of a lower saturated fatty acid with a saturated lower aliphatic alcohol at temperatures between 70° and 250° C. and under pressures exceeding 50 atmospheres with carbon monoxide in the presence of a complex compound of a cobalt halide wherein the halogen is selected from the group consisting of bromine and iodine with an organic halide selected from the group consisting of quaternary ammonium and phosphonium bromides, iodides and bromide-iodides as the catalyst.

4. A process as set forth in claim 3, wherein at least part of the halide radicles in the complex cobalt halide used as the catalyst is a bromide radicle, the other being iodide radicles.

5. A process as set forth in claim 3 wherein the oxygen compound treated is the carboxylic acid ester of a primary aliphatic saturated alcohol having not more than 4 carbon atoms.

6. A process as set forth in claim 3 wherein the carbon monoxide is admixed with hydrogen in an amount not exceeding 40 parts by volume thereof for 60 parts by volume of carbon monoxide.

7. A process for the production of aliphatic oxygen compounds which comprises treating methyl acetate at temperatures between 70° and 250° C. and under pressures exceeding 50 atmospheres with carbon monoxide in the presence of a complex compound of a cobalt halide wherein the halogen is selected from the group consisting of bromine and iodine with an organic halide selected from the group consisting of quaternary ammonium and phosphonium bromides, iodides and bromide-iodides as the catalyst.

8. A process as set forth in claim 7 wherein at least part of the halide radicles in the complex cobalt halide used as the catalyst is a bromide radicle, the other being iodide radicles.

9. A process for the production of aliphatic oxygen compounds which comprises treating methyl acetate at temperatures between 70° and 250° C. and under pressures exceeding 50 atmospheres with mixtures of carbon monoxide and hydrogen containing at most 40 per cent by volume of hydrogen in the presence of a complex compound of a cobalt halide wherein the halogen is selected from the group consisting of bromine and iodine with an organic halide selected from the group consisting of quaternary ammonium and phosphonium bromides, iodides and bromide-iodides as the catalyst wherein at least part of the halide radicles in the complex cobalt halide used as the catalyst is a bromide radicle, the other being iodide radicles.

10. A process as set forth in claim 9 wherein the catalyst contains a quaternary ammonium radicle.

11. A process as set forth in claim 9 wherein the catalyst contains a quaternary phosphonium radicle.

12. A process for the production of aliphatic oxygen compounds which comprises treating ethyl propionate at temperatures between 70° and 250° C. and under pressures exceeding 50 atmospheres with carbon monoxide in the presence of a complex compound of a cobalt halide wherein the halogen is selected from the group consisting of bromine and iodine with an organic halide selected from the group consisting of quaternary ammonium and phosphonium bromides, iodides and bromide-iodides as the catalyst.

13. A process as set forth in claim 12, wherein at least part of the halide radicles in the complex cobalt halide used as the catalyst is a bromide radicle, the other being iodide radicles.

14. A process for the production of aliphatic oxygen compounds which comprises treating ethyl propionate at temperatures between 70° and 250° C. and under pressures exceeding 50 atmospheres with mixtures of carbon monoxide and hydrogen containing at most 40 per cent by volume of hydrogen in the presence of a complex compound of a cobalt halide wherein the halogen is selected from the group consisting of bromine and iodine with an organic halide selected from the group consisting of quaternary ammonium and phosphonium bromides, iodides and bromide-iodides as the catalyst wherein at least part of the halide radicles in the complex cobalt halide used as the catalyst is a bromide radicle, the other being iodide radicles.

15. A process as set forth in claim 14 wherein the catalyst contains a quaternary ammonium radicle.

16. A process as set forth in claim 14 wherein the catalyst contains a quaternary phosphonium radicle.

17. A process for the production of aliphatic carboxylic acid anhydrides which comprises treating as ester of a lower saturated fatty acid and a lower saturated aliphatic alcohol at temperatures between 70° and 250° C. and under pressures exceeding 50 atmospheres with carbon monoxide under anhydrous conditions in the presence of a complex compound of a cobalt halide wherein the halogen is selected from the group consisting of bromine and iodine with an organic halide selected from the group consisting of quaternary ammonium and phosphonium bromides, iodides and bromides-iodides as the catalyst.

18. A process as set forth in claim 17 wherein at least part of the halide radicles in the complex cobalt halide used as the catalyst is a bromide radicle, the other being iodide radicles.

19. A process as set forth in claim 17 wherein the catalyst is a mixture of complex cobalt salts, a quaternary ammonium radicle and a quaternary phosphonium radicle.

References Cited in the file of this patent

UNITED STATES PATENTS

| | | |
|---|---|---|
| 2,593,440 | Hagemeyer | Apr. 22, 1952 |
| 2,607,787 | Mason | Aug. 19, 1953 |
| 2,658,075 | Reppe et al. | Nov. 3, 1953 |

OTHER REFERENCES

I. G. Farbenindustrie-Akt. Application I 72 531 IV d/12o. Translated by Chas. A. Meyer & Co.; Translation PC-S-V, page 40.